United States Patent [19]
Baba et al.

[11] 3,818,610
[45] June 25, 1974

[54] STUDY AID

[75] Inventors: Yoshiki Baba, Yokohama;
Yoshikazu Ayai, Kamakura, both of Japan

[73] Assignee: Kabushiki Kaisha International Library, Tokyo, Japan

[22] Filed: Nov. 22, 1971

[21] Appl. No.: 200,876

[30] Foreign Application Priority Data
Nov. 24, 1970 Japan.............................. 45-102677
Nov. 24, 1970 Japan.............................. 45-102678

[52] U.S. Cl. ................................................. 35/9 C
[51] Int. Cl. ............................................ G09b 7/00
[58] Field of Search ...................................... 35/9 C

[56] References Cited
UNITED STATES PATENTS
| | | | |
|---|---|---|---|
| 2,546,666 | 3/1951 | Fleischer.............................. | 35/9 C |
| 2,724,910 | 11/1955 | Kelly....................................... | 35/9 C |
| 3,316,660 | 5/1967 | Greenspan............................. | 35/9 C |

*Primary Examiner*—Wm. H. Grieb
*Attorney, Agent, or Firm*—Woodhams, Blanchard and Flynn

[57] ABSTRACT

A study aid comprising two independent members in combination. One of these two members comprises a printed sheet having at least one printed column of questions and a column for a plurality of selectable answers and markings adjacent the answers. These markings may be either contiguous or independent. One of these markings which represents the correct answer is made with an electro-conductive element, and the other markings representing erroneous answers are made with an electrically insulating material. These two kinds of markings are printed on a sheet material in a manner so as to be visually indistinguishable from each other. The other member is an answer-spotting electric instrument of the pen type and having at one of its ends two spaced contact members and a signal generating circuit connected to these contact members and a signal indicator provided on the other end and connected to the circuit.

By the use of this paired study aid, the user is able to recognize immediately whether his answer is correct from the signal generated by the signal indicator without having to examine the end pages of a study reference book, as in the prior art, to find a correct answer from among the numerous answers provided for the various questions.

6 Claims, 9 Drawing Figures

PATENTED JUN 25 1974　　3,818,610

INVENTORS
YOSHIKI BABA
YOSHIKAZU AYAI

BY Woodhams, Blanchard & Flynn
ATTORNEYS

INVENTORS
YOSHIKI BABA
YOSHIKAZU AYAI

BY Woodhams, Blanchard & Flynn
ATTORNEYS

STUDY AID

BACKGROUND OF THE INVENTION

1. Field of the Invention

The present invention is concerned with a study aid arranged so that the correctness of the answer selected by the user for a given question provided on a sheet can be made known at once by a signal indicator to thereby enable the user to directly determine the result of his study.

2. Description of the Prior Art

As a study aid, there have been proposed a combination of three independent members. One of them comprises a sheet of paper having a number of questions and a plurality of selectable answers with markings to be spotted for each question, all of which are printed on a sheet of paper. Another member comprises a plate of a thin, electrically insulating rigid material, one surface of which has a pattern of a predetermined number of items made with a conductive material. These conductive items are collected together on one lateral marginal portion of the plate. This member is intended for being placed beneath the said sheet of paper. The third member comprises a pen type electric spotting member having a signal generating circuit adapted to be connected to the collected respective items and also having a sharp-edged needle-like contact member provided at its foremost end.

This prior art study aid is advantageous in that the said printed sheet of paper is in no way different from ordinary printed sheets. However, it has the following disadvantages. At each time an answer is made, the user has to place the plate member beneath this printed sheet of paper so that its pattern is exactly in register with the predetermined sites of the items of answers contained on the paper sheet. Also, the answer is obtained by piercing the printed paper sheet by the needle-like edge of the pen type instrument up to the surface of the plate. Thus, there are produced injuries in the paper sheet resulting from the piercings. Furthermore, the position of the correct answer provided on the printed sheet has to be in agreement with the position of the pattern carried on the plate member. Thus, the pattern of the correct answers provided on the printed paper sheet is subjected to positional restrictions because of the pattern formed on the plate member.

SUMMARY OF THE INVENTION

It is, therefore, an object of the present invention to provide a study aid which eliminates the disadvantages of the study aids of the prior art and which is of such a proper, but simple and inexpensive, arrangement that it will give the user a direct incentive to encourage his volition to study.

Another object of the present invention is to provide a study aid which is arranged so that the printed study reference book embodying one aspect of the present invention and the answer spotting instrument can be used in a manner not substantially different from an ordinary printed paper sheet and a writing pen so that they can be used with ease.

Still another object of the present invention is to provide a study aid which can be applied equally effectively not only to the selective answer system but also to various other systems of question and answer programs.

And yet another object of the present invention is to provide a study aid which can be manufactured easily so that the electro-conductive spotting markings and the non-conductive spotting markings which are provided on the answer column of the question and answer system study reference book can both be securely deposited onto the surface of a paper sheet during the printing process.

A further object of the present invention is to provide an answer spotting electric instrument of the pen type for use with the study aid of the present invention, which instrument functions accurately in non-fluctuating contacting conditions in use and which does not injure the printed surface of the paper sheet and which exhibits an appropriate resistance in use.

A still further object of the present invention is to provide a study aid in which the answer-spotting electric instrument can be used also as a writing instrument.

DESCRIPTION OF THE PREFERRED EMBODIMENTS

Figure 1:
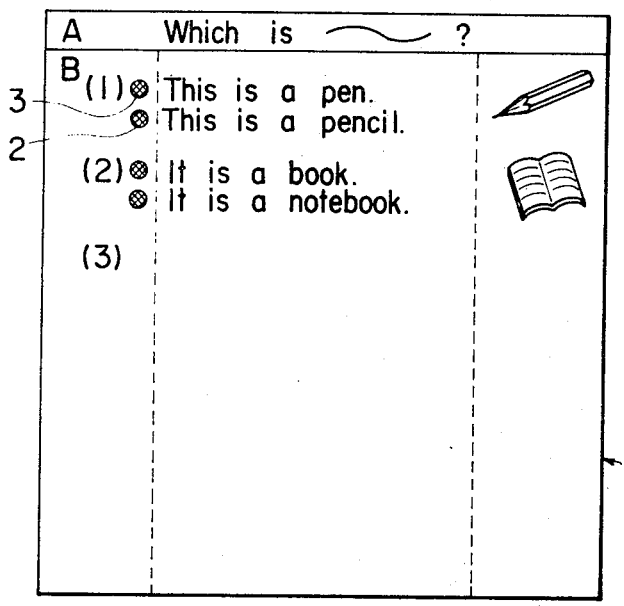
FIGS. 1, 2 and 3 are plan views of printed paper sheets, showing different modes of question and answer arrangements.
Figure 2:
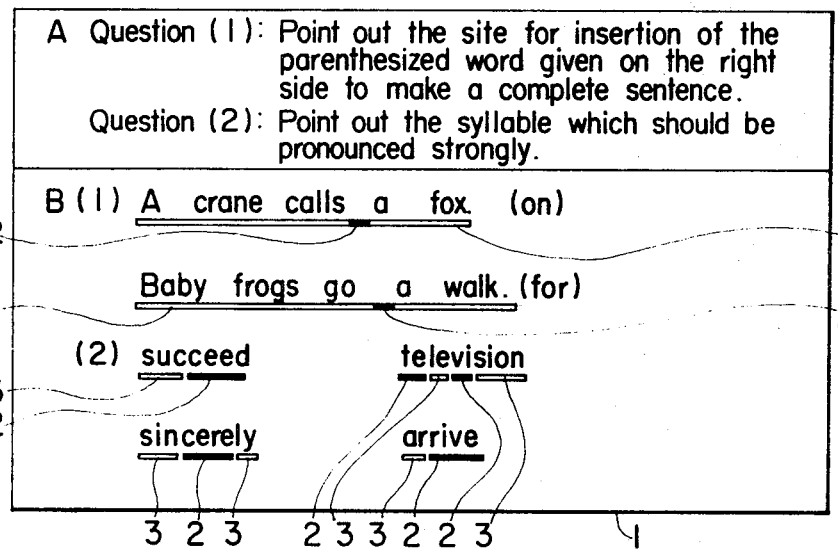

Description of some embodiments of the present invention will be made as follows:

In FIG. 1, reference numeral 1 represents generally a correct-erroneous answer selectable system, printed paper sheet having printed thereon a Column A carrying thereon a question and a Column B carrying thereon a correct answer marking 2 as well as an erroneous answer marking 3 for the question given in Column A. This printed paper sheet may be provided as an independent sheet or it may be provided as one of a plurality of such sheets bound into a book. The printed paper sheet is made of an appropriate material which may be either a paper sheet, a cloth sheet or a synthetic resin sheet. The correct answer marking 2 is produced on the paper sheet 1 by securely depositing an electro-conductive material, such as a tape-like aluminum foil, onto one surface of a paper sheet by heat-pressing on a foil-press printing machine or the like. It should be understood that, in place of the aluminum foil, an electro-conducting ink may be used as required. Also, the said erroneous answer marking 3 may be formed of any suitable kind of insulating material, provided that this marking 3 is visually indistinguishable from the correct answer marking 2, conveniently, however, the erroneous answer marking 3 is produced by applying a transparent synthetic resin insulating coating onto the top of the same material of which the correct answer marking 2 is made. These layers are then securely affixed onto the same surface of the paper sheet by a heat-pressing technique which is the same as that used for producing the correct answer marking 2. Thus, an erroneous answer marking 3 which meets the requirements of the present invention can be obtained easily. The printed paper sheet 1 shown in FIGS. 1 and 2 is of the correct-erroneous selectable type, and the correct as well as the erroneous answer markings 2 and 3 are arranged independently in a vertical row on the left side of the Answer Column B. It should be understood that the arrangement of these answer markings 2 and 3 are usually comprised of five markings containing only one correct answer marking, if the mode of answering is to select one from among the plurality of given answers, and that these five answer markings are arranged in either a vertical row or a horizontal row. On the other hand, if the question requires the result of calculation, ten markings of the required number of figures constituting a numeral, i.e., from 0 to 9, are arranged in a vertical row, thereby enabling the numerical value per se to be expressed. Thus, it is clear that various different manners of arrangement can be adopted in accordance with the respective styles of answering. Also, the manner of arranging these markings is subject to a limitation from the aspect of the printing process, such as the removal of markings from the tape-like metal foil in case such a metal foil is used. Therefore, the manner of arrangement of markings should be determined by taking these necessary conditions into consideration.

The question and answer form shown in FIG. 2 is such that markings 2 and 3 are provided as a continuous strip-like row, instead of the arrangement in FIG. 1 where they are expressed as independent markings 2 and 3. The correct answer marking(s) 2 which is made with a conductive material is provided either as a continuous part of the erroneous answer markings 3 and 3 or as a separate member or members relative to the marking(s) 3. Accordingly, by merely pointing out the aforesaid continuous part(s) or separate member(s), the user can determine the result of his study. Thus, this embodiment can be applied to purposes of a broad range, such as pointing out of the accentuation as illustrated or constructing a musical score.

Figure 3:
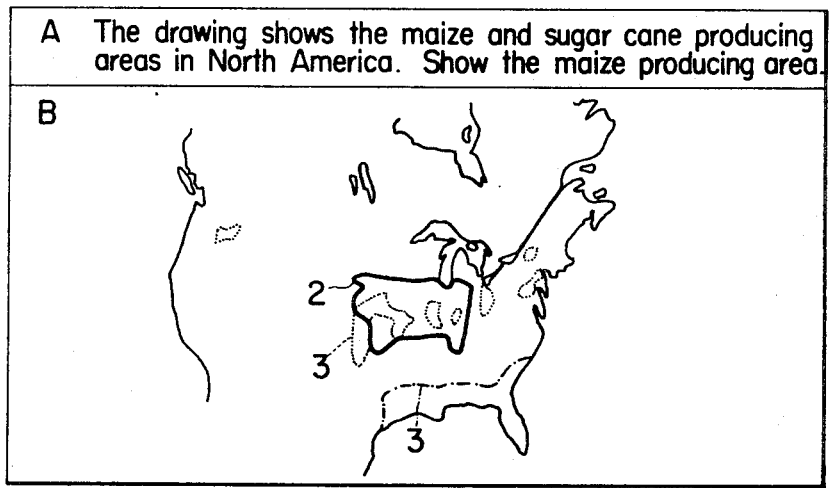

The question and answer form shown in FIG. 3 is arranged so that the correct answer marking 2 and the erroneous answer markings 3 and 3 are provided either as a congregation of a plurality of strips or as a congregation of a number of dots. The correct answer marking 2 made of a conductive material is mingled in either one or more of the erroneous answer markings 3 which are made with an electrically insulating material. Accordingly, the user is able to study by merely tracing the answer marking 2. The arrangement of these markings 2 and 3 is not limited to the purpose as illustrated but it can be applied to various other purposes such as the discovery of a labyrinth.

Figure 4:
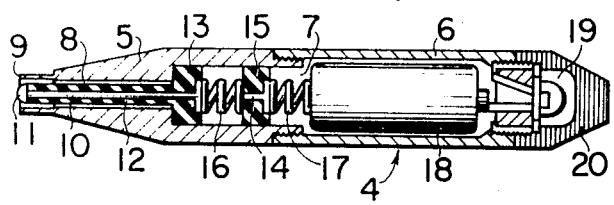
FIG. 4 is a longitudinal sectional view of an answer-spotting electric instrument which is used in spotting an answer to the question given on the printed paper sheets shown in FIGS. 1, 2 and 3.

FIG. 4 shows an answer spotting electric instrument prepared in the form of a writing pen. This instrument has the following structure. In the drawing, an electrically conductive hollow outer casing 4 is comprised of a hollow forward casing member 5 and a hollow rearward casing member 6 which is screwed thereto, forming a cylindrical cavity 7 therein. Numeral 8 represents a bore provided in front of the cavity 7 and communicating therewith. At the foremost end of the forward casing member 5, there is formed an annular contact member 9 surrounding the said bore 8. Numeral 10 represents a slidable electro-conductive rod member having a semi-spherical contact member 11 formed at its foremost end and having an electrically insulating member 12 covering the circumference of the rod portion. This slidable electroconductive rod member 10 is slidably inserted in the said bore 8. The said rod member 10 further has a rearward enlarged portion which is surrounded by the enlarged portion 13 of said insulating member and is inserted in the forward end portion of the cavity 7. Accordingly, when the semi-spherical contact member 11 is depressed, this member 11 as well as the slidable conductive rod portion 10 which is integral therewith, and the surrounding integral insulating member 12 are moved together as a unit toward the other end of the hollow outer casing 4. This semi-spherical contact member 11 is arranged in concentric relation with the annular contact member 9, with a space being left therebetween, so that these two members will not contact each other. Numeral 14 represents a fixed conductive member which is secured by means of a stationary insulating member 15 in a position close to the rear end of the cavity 7 in the forward casing member 5. Numeral 16 represents an electrically conductive contact member holding spring provided between the said fixed conductive member 14 and the said slidable conductive member 10. This spring 16 urges the slidable conductive member 10 forwardly to hold the semi-spherical contact member 11 thereof in a position protruding beyond the edge of the annular contact member 9. Numeral 17 represents an electrically conductive, battery-holding spring positioned between the fixed conductive member 14 and a battery 18 removably housed in the cavity 7 of the rearward casing member 6. Numeral 19 represents a luminescing member having its terminals connected to the battery 18 and to the rearward casing member 6 and forming a signal generating means which is detachably mounted on the rear end of the rearward casing member 6. Numeral 20 represents a light ray-diffusing cover member removably mounted to the rearward casing member 6 and covering the said luminescing member. This cover member 20 is made with a transparent or a translucent piece of glass or synthetic resin. It may be made of a colored material as desired.

Figure 5:
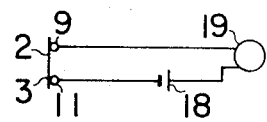
FIG. 5 is a circuit diagram of the answer spotting electric instrument shown in FIG. 4.

The user of the answer spotting electric instrument of pen type of the foregoing construction either selects, points out or traces either one of the answer markings 2 and 3 provided in the Answer Column B, as an answer to the question asked in the Question Column A. If he lightly presses upon the correct answer marking 2 with the tip of the answer spotting electric instrument, then the semi-spherical contact member 11 together with its integral slidable conductive rod member 10 is pushed rearwardly in the bore 8 against the force of the contact-holding spring 16 as shown in FIG. 5. Whereupon, both the semi-spherical contact member 11 and the annular contact member 9 are brought into contact with the correct answer marking 2 which is made of a conductive material. Accordingly, there is made a circuit as follows: battery 18 luminescing member 19 hollow outer casing 4 annular contact member 9 correct answer marking 2 semi spherical contact member 11 slidable conductive rod member 10 contact member holding spring 16 fixed conductive member 14 battery holding spring 17 battery, and thus the luminescing member 19 luminesces. In the event that the user selects, points out or traces an erroneous answer marking 3, this marking 3 which is made with an electrically insulating material leaves the said circuit in its broken state. Accordingly, the luminescing member 19 will not luminesce. In this way, the user is able to make an answer and at the same time can be informed of the result of his study, and thus he is given a good stimulus for positively encouraging his desire of study.

Figure 6:
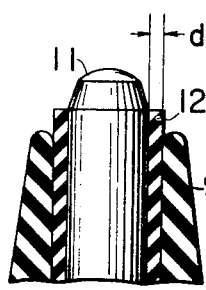
FIGS. 6, 7 and 8 are fragmentary longitudinal sectional views, showing various modified examples of contact members provided at the foremost end of the answer-spotting electric instrument.
Figure 7:
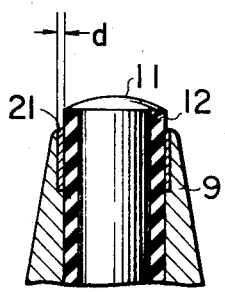
Figure 8:
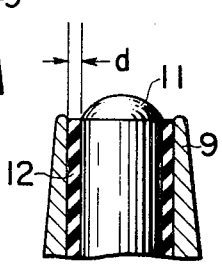
Figure 9:
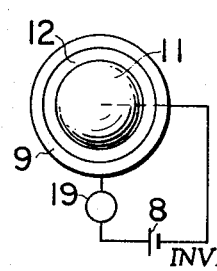
FIG. 9 is a plan view of the electric instrument shown in FIG. 8 in its circuit diagram.

FIGS. 6, 7 and 8 show various different examples of the contact portion comprising a semi-spherical contact member 11 and an annular contact member 9.

The embodiment of FIG. 6 is arranged so that an insulating member 12 is applied around the semi-spherical member 11 which has a cylindrical portion having a tapered profile adjacent to the semi-spherical end so that, at the time of contacting a marking, i.e., at the time the semi-spherical contact member 11 is withdrawn into the bore 8, there is left a stuffed space of insulation d between the semi-spherical contact member 11 and the annular contact member 9.

FIG. 7 shows a modified example which is arranged so that an insulating member 21 is provided around the inner circumferential face of the annular contact member 9.

FIG. 8 shows a further modification of FIG. 6 and is arranged so that, instead of the provision of a tapered cylindrical portion, the semi-spherical end is formed directly at the end of the rod portion 10.

These embodiments shown in FIGS. 6, 7 and 8 all have an insulating member to maintain a space filled with insulation at the time a marking is pressed upon by the tip of the answer-spotting electric instrument. This space filled with insulation can be replaced by leaving an air space between the semi-spherical conductive member 11 and the annular conductive member 9 as shown in FIG. 4.

In each of the aforesaid four examples, the inner contact member 11 is adapted to slide relative to the outer contacting member 9. It should be understood, however, that conversely the inner contact member 11 can be fixed and the outer contact member 9 can be adapted to slide relative to the inner contact member 11. Or, alternatively, the contact portions of both the inner and the outer contacting members 11 and 9 may be made so as to be elastic by making them of a conductive rubber or like conducted elastic material (as shown by outer member 9 in FIG. 6) and these two members may be stationary instead of being relatively slideable. It should be understood, however, that either one of the inner and the outer contact members may have a contact portion made of a conductive rubber or like elastic material, and also that these arrangements may be incorporated in any appropriate manner in the examples shown in FIGS. 4, 6, 7 and 8.

As shown by the foregoing examples, the inner contact member 11 and the outer contact member 9 are arranged in concentric relation relative to each other with there being an insulating space therebetween. Accordingly, when the user grips, the answer spotting electric instrument of the pen type of the present invention and applies a force onto the tip in whichever direction he likes against a marking 2 or 3, he can always obtain the same state of contacting the marking. Besides, there is no fear of injuring the surfaces of the markings. By an appropriate selection of the elasticity of either the contact-holding spring 16 or the elastic conductive contact members, it is possible to give a suitable elastic resistance when pressing the tip of the instrument against a marking. If desired, the semi-spherical contact member 11 may be made with a carbon material and arranged so that this member 11 may be held at a further protruding position than the one illustrated, beyond the edge of the annular contact member 9 by the provision of a contact-changeover push button or like means, so that this electric detecting means or the answer-spotting electric instrument may also have an additional function equal to a writing instrument.

The illustrated examples of the answer spotting electric instrument employ a luminescing member 19. It should be understood that this luminescing member 19 may utilize an electric bulb or a discharge lamp or it may be substituted by a vibratable needle.

As stated above, according to the present invention, the user can give an answer by the use of a pen type instrument on a question and answer sheet, which sheet is not substantially different in appearance from an ordinary printed sheet or a booklet, and he can directly be informed of the result of his study from the signal-generating means at the same time that he makes an answer. Based on this result of study thus obtained, the user is given a good stimulus, encouraging his desire of study, and therefore, the effect of his study is markedly enhanced. The answer spotting electric instrument is of a pen type and is compact in size. The detecting operation by this instrument is ensured for unfailing accuracy by the marking-contact actions of the inner contact member and the outer contact member which are arranged in concentric relation relative to each other with an insulating member being interposed therebetween. The markings which are detected sustain no injury when contacted by the tip of the detecting means. Besides, the answer spotting instrument can provide an appropriate degree of resistance when used. According to the present invention, there can be obtained the various advantages as described above.

The embodiments of the invention in which an exclusive property or privilege is claimed are defined as follows:

1. A study aid comprising in combination:
    a printed sheet with an answer column having, formed on the sheet, a correct answer marking made of an electro-conductive material for each given question or demand and also having, formed on the sheet separately from the said correct answer marking, at least one erroneous answer marking made of an electrically insulating material for each given question or demand, the said correct answer marking and the said erroneous answer marking being visually indistinguishable in appearance from each other, said markings being provided in the form of an elongated strip having correct answer markings and erroneous answer markings substantially continuously connected together; and
    an answer spotting electric instrument comprising an elongated, hollow casing made of electro-conductive material and having a conical portion adjacent one end thereof, said casing having an elongated bore of substantially uniform diameter extending through said conical portion from said one end thereof, an enlarged internal chamber extending from the inner end of said bore substantially to the other end of said casing and a signalling device mounted on the other end of said casing, said signalling device having one terminal thereof in electrical conducting relationship with said casing, said casing having an integral annular conductive contact surface on said one end thereof and surrounding the outer end of said bore; an electrically conductive, longitudinally slidable rod extending through said bore and spaced from the wall thereof, said rod having a contact member on its outer end, said contact member being surrounded by and spaced radially from said annular contact surface of said casing; an elongated, thin walled, substantially uniform diameter sleeve of electrical insulating material surrounding said rod and slidably extending through said bore and electrically insulating said rod from said casing, said insulating sleeve having an enlarged portion fixed on the inner end thereof and slidably disposed in said enlarged internal chamber for closely guided sliding movement therein; a first electrically conductive spring disposed in said chamber, spaced from said casing and having one end in electrical contact with the inner end of said rod for continuously urging said rod so that its contact member projects beyond said one end of said casing; an insulating member stationarily mounted in said chamber spaced from said sleeve and having an electrically conductive member extending therethrough, one end of said conductive member being in contact with the other end of said first spring; a second electrically conductive spring disposed in said chamber, spaced from said casing and having one end in electrical contact with the other end of said conductive member; a battery slidably disposed in said chamber and engaging the other end of said second spring so that the battery is continuously urged toward said other end of said casing, said battery having a contact electrically engaged with the other terminal of said signalling device.

2. A study aid according to claim 1, in which:
the said correct answer marking is made of a metal foil affixed on the sheet and the said erroneous answer marking is made with a metal foil affixed on the sheet and securely covered with a thin transparent layer of electrically insulative coating.

3. A study aid according to claim 2, in which: the said metal foil is aluminum foil and the said thin transparent layer is made of synthetic resin which is heat-pressed on the aluminum foil.

4. A study aid according to claim 1, in which at least one of said rod and said casing is made of an electro-conductive rubberlike elastic material.

5. An answer spotting electric instrument comprising an elongated hollow casing made of electro-conductive material and having substantially the shape of a writing pen, said casing having a conical portion with an integral annular electro-conductive contact surface on one end thereof and an elongated bore of substantially uniform diameter extending through said conical portion from said one end thereof, said casing also having an enlarged internal chamber extending from the inner end of said bore;

said casing further having an electrically operated signalling device thereon, said signalling device having one terminal electrically connected to said casing;

an elongated, electro-conductive rod slidably mounted in and extending through said bore and being spaced radially from said casing with the tip of said rod being adjacent to, substantially concentric with and spaced radially from said annular contact surface, the inner end of said rod projecting into said enlarged internal chamber;

at least one of said casing and said rod being made of an electro-conductive rubberlike elastic material;

a thin walled, substantially uniform diameter sleeve of insulating material fixedly surrounding said rod and slidably disposed within said bore for preventing direct contact between said rod and said casing, said sleeve having an integral enlarged portion on the inner end thereof snugly slidably received within said enlarged internal chamber; and an electrical energy source disposed within said enlarged internal chamber and connected between the inner end of said rod and the other terminal of the signalling device.

6. An answer spotting electric instrument according to claim 5, in which:
said rod is made of carbon and including means to hold the tip of said rod at a position protruding substantially beyond said contact surface so that said rod can serve as a writing instrument.

* * * * *